March 28, 1967 D. R. HOWARD 3,311,134
COMPOSITE TUBULAR PRODUCTS AND METHOD OF MAKING SAME
Filed Dec. 30, 1963 2 Sheets-Sheet 2
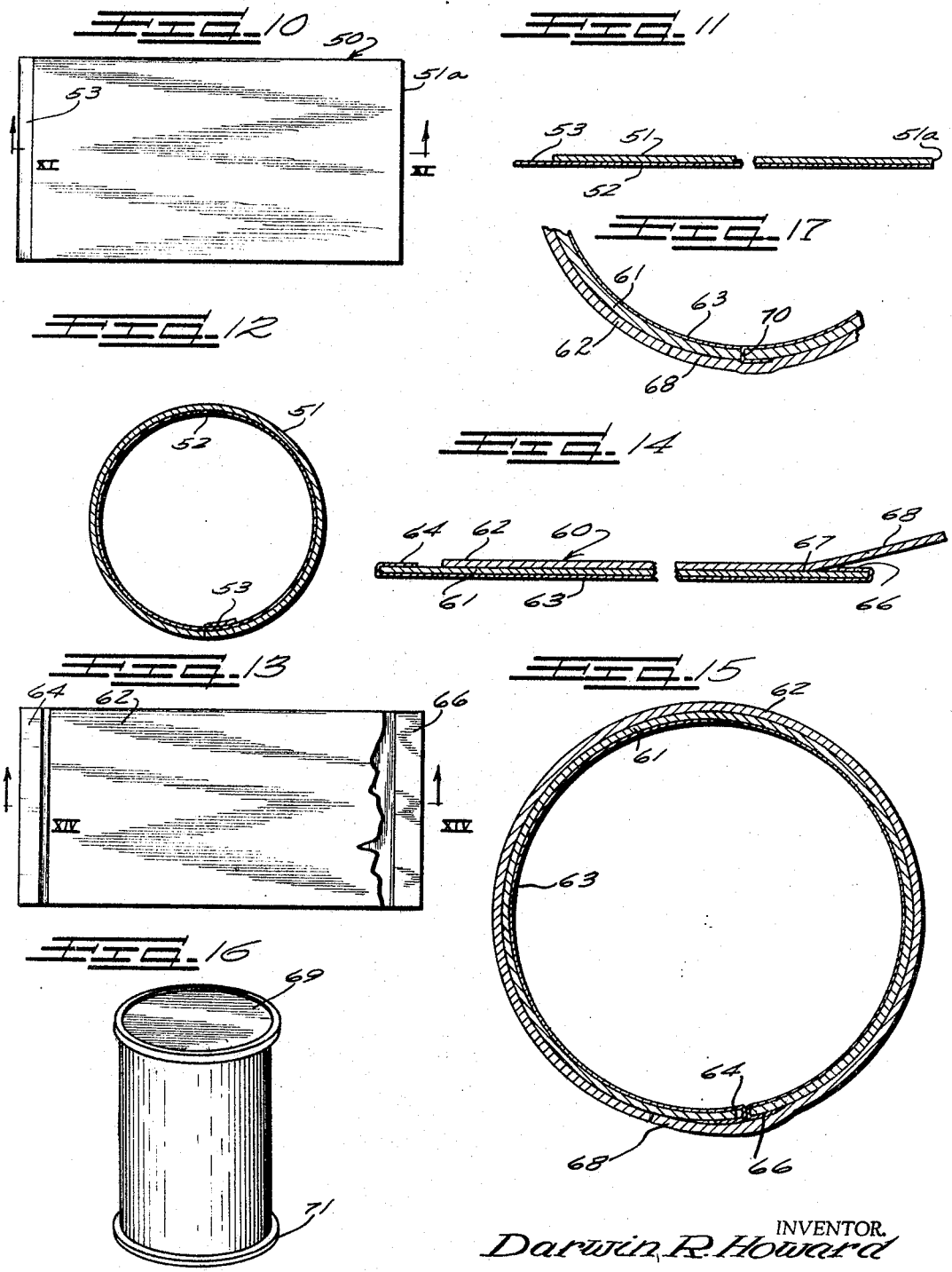
INVENTOR.
Darwin R. Howard
BY
ATTORNEYS 3,311,134
COMPOSITE TUBULAR PRODUCTS AND
METHOD OF MAKING SAME
Darwin R. Howard, 140 Melrose,
Kenilworth, Ill. 60043
Filed Dec. 30, 1963, Ser. No. 334,520
2 Claims. (Cl. 138—142)

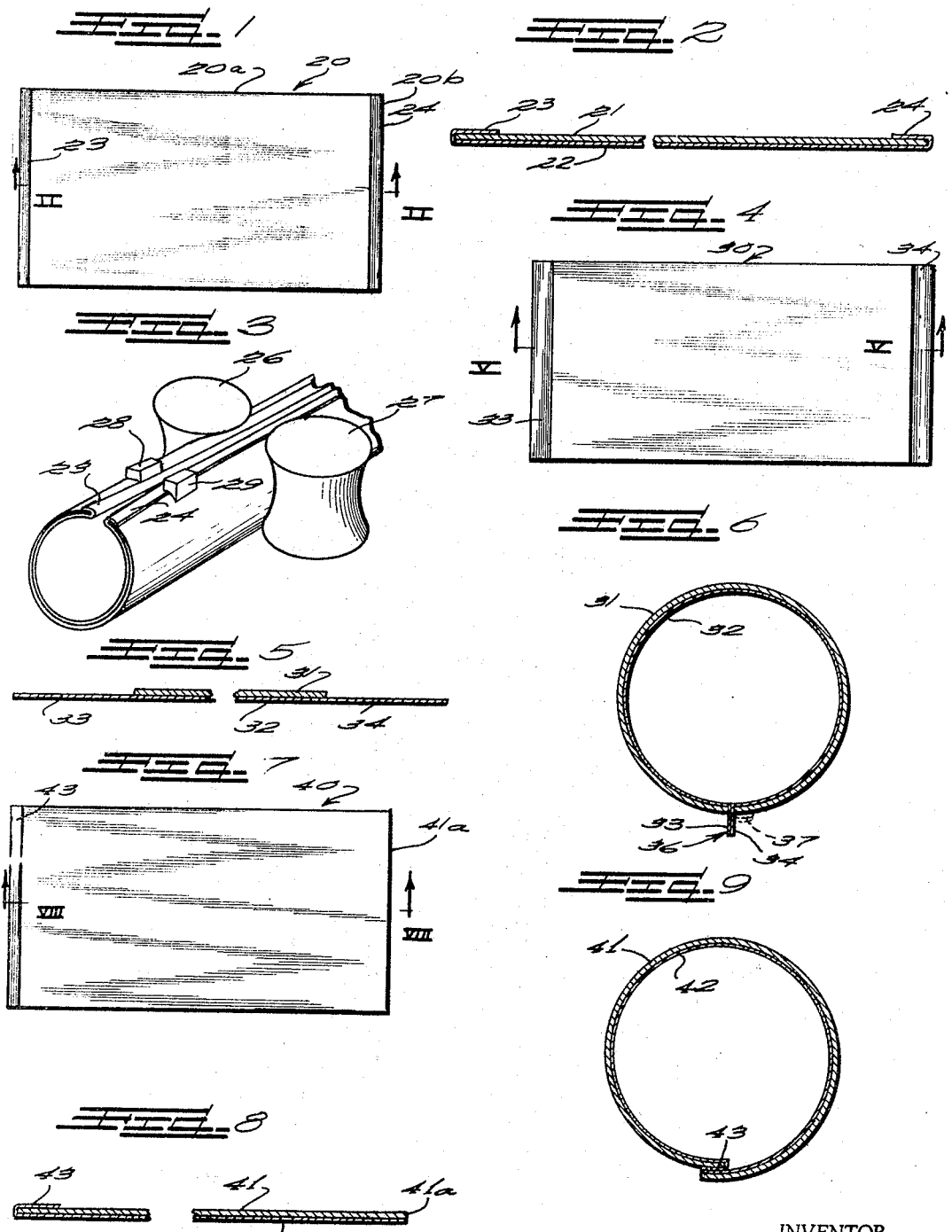

The present invention relates to improvements in the manufacture of tubular articles, and more specifically, to the manufacture of composite tubular articles employed in the manufacture of containers such as cans and the like.

The use of relatively heavy gauge sheet metal in the manufacture of containers for oil, soft drinks, beer, and the like contributes a substantial amount to the price which the consumer has to pay for the product. Some attempts, therefore, have been made to replace the relatively heavy sheet metal with composite structures, but none to my knowledge has met with unqualified success. In the case of packaging soft drinks and beer, for example, the container must be able to withstand substantial internal pressures without any gas permeation through the walls of the container. Attempts to employ composite articles with adhesive bonds between the laminates, as attempted in the past, have not always resulted in meeting this requirement.

With the foregoing in mind, an object of the present invention to provide an improved tubular composite article of substantial strength which is useful in the manufacture of heavy duty cans and the like.

Still another object of the invention is to provide a tubular composition article which is completely resistant to gas permeation, even at substantial internal pressures.

Still another object of the invention is to provide a tubular article useful in cans and the like, the article being substantially less expensive than the heavy gauge sheet metal stock now being employed for similar purposes.

A further object of the present invention is to provide a can structure which can be manufactured on conventional tube making machinery at high speeds.

In accordance with the present invention, I provide a composite tubular article comprising a paperboard backing in the shape of a tube, the backing having a metallic foil secured thereto of sufficient thickness so that it is a gas and vapor barrier. The foil constitutes the inner surface of the tubular article, and the ends of the foil are welded together to form a gas tight seam for the tubular article. In the construction of the present invention, I do not rely upon any adhesive bonds within the interior of the tubular article and hence I am able to provide integral metal surfaces at the interior of the can which are completely inert to the contents.

A further description of the invention will be made in conjunction with the attached sheets of drawings which illustrate several embodiments of the invention.

In the drawings:

FIGURE 1 is a plan view of a blank of the type which may be employed for the purposes of the present invention;

FIGURE 2 is a cross-sectional view taken substantially along the line II—II of FIGURE 1;

FIGURE 3 is a view in perspective illustrating schematically the manner of welding the abutting end portions of the composite tubular article, employing the blank shown in FIGURES 1 and 2;

FIGURE 4 is a plan view of a modified form of blank which can be employed for the purposes of the present invention;

FIGURE 5 is a cross-sectional view taken substantially along the line V—V of FIGURE 4;

FIGURE 6 is an end elevational view of a finished tubular article produced with the blank of FIGURES 4 and 5;

FIGURE 7 is a plan view of another modified form of blank;

FIGURE 8 is a cross-sectional view taken substantially along the line VIII—VIII of FIGURE 7;

FIGURE 9 is an end elevational view of a tubular article produced from the blank illustrated in FIGURES 7 and 8;

FIGURE 10 is a plan view of another modified form of blank useful for the purposes of the present invention;

FIGURE 11 is a cross-sectional view taken substantially along the line XI—XI of FIGURE 10;

FIGURE 12 is an end view of the tubular article produced from the blank shown in FIGURES 10 and 11;

FIGURE 13 is a plan view of still another form of blank which can be employed for the purposes of the present invention;

FIGURE 14 is a cross-sectional view of the blank shown in FIGURE 13;

FIGURE 15 is an end view of the tubular article produced by using the blank of FIGURES 13 and 14;

FIGURE 16 is a view in perspective of a completed can assembly employing the tubular articles produced according to the present invention; and FIGURE 17 is a fragmentary view of another modified form of the invenition.

As shown on the drawings:

In FIGURES 1 and 2 reference numeral 20 indicates generally a blank useful for the purposes of the present invention, the blank 20 consisting of a laminate of a paperboard backing 21 to which is bonded a metallic foil 22, the foil serving to define the inner wall of the completed tubular article. In the type of structure shown in FIGURES 1 and 2, the paperboard backing 21 should be relatively flexible, so that it can be conveniently handled on high speed tube making machinery. Generally, I prefer to use single-ply paperboard having a thickness of 20 to 26 points (0.020 to 0.026 inch). The paperboard backing 21 is preferably coated on one or both sides with a vapor impermeable resinous coating such as polyethylene, and the foil 22 can be affixed to the resinous coating by means of heat sealing or the like.

The foil itself is as thin as possible, but still thick enough to provide a complete integral barrier to the passage of gas. Foil thicknesses of 0.0008 to 0.001 inch have been found to be acceptable for this purpose.

In the form of the invention shown in FIGURES 1 and 2, the foil 22 covers the inner face of the backing 21 completely, and has opposed end portions 23 and 24 secured to the opposite face of the backing 21. For purposes of orientation, the major dimension of the blanks to be described, designated at reference numeral 20a in FIGURE 1 will be referred to as the longitudinal dimension and the corresponding edges as the longitudinal edges. The opposite sides of the blank 20b will be referred to as the transverse edges, and the transverse dimension is that dimension which extends axially of the can when the tubular article is formed.

The blank of FIGURES 1 and 2 is then formed into tubular shape by conventional machinery for forming tubes from paperboard structures, but leaving a slight gap between the confronting opposed end portions 23 and 24. The end portions are then welded together into a gas impermeable seam using the type of apparatus shown in FIGURE 3 of the drawings. The apparatus illustrated in that figure employs the "Thermatool" process developed by the New Rochelle Thermatool Corporation of New Rochelle, N.Y. As illustrated in FIGURE 3, the preformed tube is passed between a pair of arcuately contoured squeeze rolls 26 and 27, while a high frequency current is applied to the article being welded by means of a pair of electrodes 28 and 29. The aforementioned welding process relies upon the fact that high frequency currents (at about 450 kilocycles or so) heat only the edges of the material to be welded, and when these edges are brought to welding temperature, the pressure rolls force them together to produce a forge weld. In other words, the path of the heating current extends along the V formed by the confronting end portions 23 and 24 and is substantially isolated to that area. At these high frequencies, the current travels only to a very shallow depth of the metal and does not affect the underlying backing. The metal portions are pinched together at the point of the V, and the molten metal, if present, is squeezed out so that the internal weld becomes essentially a forged weld. While this type of welding process is not normaly employed with very thin foils, I have found that incorporation of the foil as a laminate on the paperboard makes it possible to secure proper alignment or register of the edges, enabling the high frequency welding to occur as though thicker sections of metal were present.

The structure shown in FIGURES 4 to 6, inclusive, represents another embodiment of the invention. The blank shown in FIGURES 4 and 5 at reference numeral 30 includes a paperboard backing 31 whose inner face is completely covered by a foil layer 32. The foil layer is longer than the paperboard backing on both sides, so that unsupported opposed end portions 33 and 34 of foil extend beyond the two transverse edges of the blank. Then, when the blank is formed into a tubular shape by the tube making machinery, the opposed end portions 33 and 34 are folded to provide a radially extending fin 36. The confronting surfaces of the end portions 33 and 34 are then welded together preferably by the aforementioned high frequency welding technique and the resulting welded fin is folded down against the periphery of the container as illustrated at reference numeral 37. The fin may then be secured to the periphery of the container by means of a tape which is tightly adhered to the outside of the tube. If the welding heat discolors the metal foil at the weld area, the covering tape hides the discoloration.

In the form of the invention illustrated in FIGURES 7 and 9 inclusive, the blank is represented at reference numeral 40 and includes a paperboard backing 41 and a foil liner 42 bonded to the inner face of the backing 41. The foil 42 is coextensive with one transverse edge 41a of the backing 41, but at the opposite end has an end portion 43 which is folded about the opposite transverse edge and secured thereto. Then, when the blank is formed into the tubular shape as illustrated in FIGURE 9, the confronting portions of foil from the end portion 43 and the remainder of the foil 42 are lap welded together to provide a gas tight seam for the tubular article. A reinforcing tape may be employed, if desired, over the resulting seam.

In the embodiments shown in FIGURES 10 to 12 inclusive, the blank 50 includes a paperboard backing 51 and a foil 52 securely bonded thereto. The foil 52 is coextensive with one transverse edge 51a of the backing 51 and has an unsupported free end portion 53 extending beyond the other transverse edge. When this type of blank is rolled into a tube, as illustrated in FIGURE 12, the unsupported free edge 53 is welded to the confronting portion of the coil 52 within the interior of the tube, thereby providing a completely internal seam for the resulting tube assembly.

A particularly preferred form of the invention is that illustrated in FIGURES 13 to 15 inclusive of the drawings. The blank 60 in this instance consists of a laminate of two plies of paperboard, an inner ply 61 and an outer ply 62. The two plies 61 and 62 are of the same transverse dimension, but are overlapped as best illustrated in FIGURE 14. Each of the plies 61 and 62 may consist of 8 or 10 point paperboard. A foil layer 63 is bonded to the inner ply 61, and has opposed end portions 64 and 66 folded about the transverse edges of the inner ply 61 and secured to the opposite face thereof. The outer ply 62 may also be provided with a fold line 67 leaving an extended edge 68. When this type of blank is formed into a tube as illustrated in FIGURE 15, the opposed end portions 64 and 66 are placed into confronting abutting relationship and welded together to form an internal gas impermeable seam. The end portion 68 of the outer ply 62 covers the seam and any discoloration which may be present, and this end portion 68 may be heat sealed or otherwise secured in abutting relation to the opposite marginal edge of the ply 62, and secured thereto by heat sealing or by an adhesive strip. This construction provides a completely sealed inner and outer seam for the container.

A further modified form of the invention is illustrated in FIGURE 17. This form is similar to that shown in FIGURE 15 except that the marginal edges of the foil 63 are not folded over the edges of the ply 61, but extend therebeyond. The edges of the foil are brought together in confronting relation to form a fin 70 which is then tucked between the inner ply 61 and the outer ply 62, and hidden by the end portion 68 which abuts the other marginal edge of the outer ply 62.

The tubular structures can be formed continuously on a tube forming and welding apparatus, after which the tubular sections can be severed to the desired lengths. Then, end caps 69 and 71 for the top and bottom, respectively, may be inserted and secured to the ends of the tube in a conventional manner used for can constructions.

Substantial economies are effected with the use of the tubular articles of the present invention because of the thin foil which may be employed. Whereas the method described herein can make use of foils as thin as 0.001 inch, or less, they can be used in replacement of metal tubes having wall thicknesses ranging from about 0.07 to 0.10 inch in thickness.

The method described is readily adaptable to a straight line continuous operation. At the beginning of the production line, the rolls or coils of metal foil and the supporting backing material can be unwound over each other and bonded together. The laminated composite web then is passed through the pipe forming mill, and made into a round shape. Next, the welding head welds the abutting or overlapping foil edges of the tube, whereupon saws or other cut off devices cut the tube in the desired lengths. The rigid, stiffer composite foil and board web has the body and substance to be formed into tubes at high speeds. Furthermore, the laminated web structure enables the side edges of the web to be precisely aligned or registered for the welding of the continuous seam.

It should be evident that various modifications can be made to the described embodiments without departing from the scope of the present invention.

I claim as my invention:

1. A composite tubular article comprising a pair of paperboard plies of the same transverse dimension secured together in overlapping relation, the inner face of the inner ply having a metallic foil secured thereto, said foil having opposed end portions folded over the transverse edges of said inner ply and being secured to the outer face of said inner ply, said plies being formed in the shape of a tube with the said end portions of said foil being welded together to form a gas tight seam.

2. A composite tubular article comprising a pair of paperboard plies of the same transverse dimension secured together in overlapping relation, the inner face of the inner ply having a metallic foil secured thereto, said foil having opposed end portions folded over the transverse edges of said inner ply and being secured to the outer face of said inner ply, said plies being formed in the shape of a tube with the said end portions of said foil being welded together to form a gas tight seam, the outer ply having an end portion extending circumferentially beyond said seam and being secured to the periphery of said tubular article.

References Cited by the Examiner
UNITED STATES PATENTS

| | | | |
|---|---|---|---|
| 1,320,692 | 11/1919 | Hulse | 161—104 |
| 1,579,504 | 1/1926 | Lane | 161—104 |
| 2,199,150 | 4/1940 | Chace | 138—152 X |
| 2,803,730 | 8/1957 | Karl | 138—170 X |
| 3,004,694 | 10/1961 | Karl | 138—170 X |
| 3,014,630 | 12/1961 | Whelan et al. | 229—4.5 |
| 3,054,428 | 9/1962 | Crawford | 138—141 |
| 3,080,893 | 3/1963 | Craycraft | 138—141 |
| 3,104,682 | 9/1963 | Schenk et al. | 138—128 |
| 3,213,890 | 10/1965 | Battersby et al. | 138—170 X |

LAVERNE D. GEIGER, *Primary Examiner.*

FRANKLIN T. GARRETT, *Examiner.*

T. L. MOORHEAD, J. L. KRUTER,
*Assistant Examiners.*